(12) United States Patent
Olson

(10) Patent No.: US 6,988,746 B2
(45) Date of Patent: Jan. 24, 2006

(54) NUT TYPE RAINTIGHT THREADLESS COUPLINGS AND CONNECTORS FOR ELECTRICAL CONDUITS

(76) Inventor: Mark H. Olson, 3764 Fairfax Way, South San Francisco, CA (US) 94080

( * ) Notice: Subject to any disclaimer, the term of this patent is extended or adjusted under 35 U.S.C. 154(b) by 80 days.

(21) Appl. No.: 10/421,309

(22) Filed: Apr. 23, 2003

(65) Prior Publication Data

US 2004/0070207 A1    Apr. 15, 2004

Related U.S. Application Data

(60) Provisional application No. 60/417,015, filed on Oct. 9, 2002.

(51) Int. Cl.
| | |
|---|---|
| *F16L 11/118* | (2006.01) |
| *F16L 25/00* | (2006.01) |
| *F16L 19/00* | (2006.01) |

(52) U.S. Cl. .............................. 285/151.1; 285/154.4; 285/149.1; 285/339; 285/342; 285/353; 285/354

(58) Field of Classification Search ............ 285/149.1, 285/151.1, 154.4, 339, 342, 343, 353, 354
See application file for complete search history.

(56) References Cited

U.S. PATENT DOCUMENTS

| | | | | |
|---|---|---|---|---|
| 1,488,175 | A | * | 3/1924 | Strandell .................. 174/65 R |
| 2,100,796 | A | * | 11/1937 | Church ....................... 285/340 |
| 2,255,673 | A | * | 9/1941 | McDermett ............. 285/382.7 |
| 2,339,771 | A | * | 1/1944 | Davies ...................... 277/627 |
| 2,474,178 | A | * | 6/1949 | Wurzburger ................ 285/342 |
| 2,479,483 | A | * | 8/1949 | Ekleberry ................... 439/191 |
| 2,651,529 | A | * | 9/1953 | Wayman .................. 285/151.1 |
| 2,821,567 | A | * | 1/1958 | Bergan ......................... 174/78 |
| 3,567,843 | A | * | 3/1971 | Collins et al. ................ 174/51 |
| 3,603,912 | A | * | 9/1971 | Kelly .......................... 439/273 |
| 3,951,463 | A | | 4/1976 | Fannin et al. |
| 4,030,741 | A | * | 6/1977 | Fidrych .................... 285/149.1 |
| 4,047,743 | A | * | 9/1977 | Weintraub et al. .......... 285/340 |
| 4,358,079 | A | * | 11/1982 | Navarro ....................... 248/56 |
| 4,544,800 | A | * | 10/1985 | Katsuura ................ 174/65 SS |
| 4,547,623 | A | * | 10/1985 | Van Brunt et al. ........ 174/35 R |
| 4,606,562 | A | * | 8/1986 | Saraceno ................. 285/149.1 |
| 4,801,158 | A | * | 1/1989 | Gomi ........................... 285/52 |
| 5,165,735 | A | | 11/1992 | Nardi et al. |
| 6,106,031 | A | | 8/2000 | Guginsky |
| 6,250,686 | B1 | * | 6/2001 | Becker et al. ............. 285/21.2 |
| 6,505,860 | B2 | * | 1/2003 | Trichard ..................... 285/104 |

* cited by examiner

*Primary Examiner*—James M. Hewitt
(74) *Attorney, Agent, or Firm*—Joseph L. Strabala

(57) ABSTRACT

In fittings designed to connect threadless electrical conduits, the improvement of providing raintight fittings, having a hollow cylindrical housing with a bore adapted to receive an end of a conduit to be connected with such a fitting and a compression ring with a solid ring portion assembled on the conduit along with a seal, with the solid ring portion of the compression ring providing a radial surface for advancing the seal along the conduit and to compress the seal radially against the conduit to effect a raintight seal between the housing and such conduit and a compression means which is forced against such conduit by a nut system to lock such conduit in the fitting when the radial face of the compression ring abuts against the housing after compressing the elastomer seal against such conduit.

18 Claims, 7 Drawing Sheets

NUT TYPE RAINTIGHT THREADLESS COUPLINGS AND CONNECTORS FOR ELECTRICAL CONDUITS

This application claims priority to U.S. Provisional Application Ser. No. 60/417,015, filed Oct. 9, 2002.

BACKGROUND OF THE INVENTION

Conduits are employed in electrical installation in buildings, exterior walls of buildings and similar structures, and are typically identified as Electrical Metallic Tubing [EMT], Ridge Metal Conduit [RMC], Intermediate Metal Conduit [IMC] and Aluminum Ridged Conduit [AL RC] conduits. These conduits are available in two type, threaded and threadless. Such conduits are sold in various lengths, usually about 10 feet, and in the field the threadless types are cut to the desired length for installation in junctions boxes, connected end to end to achieve a longer conduit run or connected to elbows or the like.

To connect threadless conduits end to end, couplings are required and to connect such conduits to junction boxes, connectors are used. Such couplings and connectors can be purchased from various suppliers stocking such parts. Couplings and connectors for EMT, RMC, IMC and AL RC threadless conduits are illustrated for conduit sizes from ½ inch to 4 inches, up to 6 inches for some conduits, in the *National Electrical Code Handbook* which is published every three years.

Since it is difficult to put pipe threads on the ends of the conduits in the field, especially large size conduits (conduit sizes greater than an inch and a half) most installation conduits use threadless conduits and "threadless" couplings and connectors to join them to other conduits and/or junction boxes. For each of the conduits, EMT, RMC, IMC and AL RC, the specifications in the referenced handbook for threadless couplings and connectors for such conduits are:

"a) Threadless. Threadless couplings and connectors used with conduit shall be made tight. Where buried in masonry or concrete they shall be concrete tight. Where installed in wet locations they shall be the raintight type."

Applicant, an electrical contractor, has tested the available threadless couplings and connectors available in the industry by closing off one end or a short piece of conduit joining another piece of conduit to it with a coupling and submerging the short piece of conduit and coupling in a pool of water. None of the commercially available couplings were raintight based on these tests; that is the short piece of conduit and coupling filled with water in a short period of time. A similar test was done with commercially available connectors and none were found to be raintight.

In part water ingress results from variations in the outside diameter of the conduits and variations in the inside diameter of the connectors or couplings, which in larger conduit size installations can result in gaps in the range of 0.060 inch (or more) between the conduit and the connector.

On hundreds of thousands of roofs on commercial buildings, exterior walls and in industrial plants EMT, RMC, IMC and AL RC conduits are installed with threadless couplings and/or connectors which are not raintight even though the specifications for these installations more often than not require that the threadless couplings or connectors used should be "listed" as raintight.

While rain water is essentially distilled water with few impurities, once it contacts a metal conduit it dissolves metal atoms, along with other impurities, and becomes more conductive when it enters the interior of such conduits through a coupling or connector which is not raintight. As such water passes through the interior of the conduit system, it may short out electrical circuits, switch gear and the like. Of course corrosion from the intrusion of the rain water compromises such installation still further. For these reasons engineers specify that raintight threadless coupling and connectors for such conduits be used in wet locations, such as the roofs and exteriors of buildings. The problem is that all commercially available connectors and couplings for conduits in wet locations are not raintight with few exceptions, see for example the connector/coupling with an exterior elastomer boot illustrated in U.S. Pat. No. 3,951,436. The connectors/couplings in '436 patent are generally unsatisfactory due the ultra violet (UV) degradation of the boot, after which water intrusion can be extensive. Moreover the exposed boot is subject to damage during installation which can lead to its failure, e.g., contact with the sharp end of a conduit being inserted or tools used for installing and mounting conduits. As a result it is not often used in installations, if at all. In addition, rubber covers have been employed over the ends of couplings and connectors which are slipped on ends of the these fittings after the conduits have been secured in the fitting having been previously placed on the conduit, see for example U.S. Pat. No. 6,106,031 illustrating plastic end caps and an O-ring which are placed between the conduit and the fitting to effect a seal without any radial compression of the O-ring. Such covers also may provide some temporary sealing if the aperture in the cover is of a lesser diameter than the outside diameter of the conduit but such a seal may be short lived due to UV degradation, mechanical displacements and/or mechanical damage. Another coupling/connector design is illustrated in U.S. Pat. No. 5,165,735 which uses a un-compressed sealing washer to assist in reducing water intrusion into such fittings. Due to the ability of the washer to shift in the fitting and damage to the washer when the sharp end of a conduit is inserted, it may or may not be raintight initially and/or may ultimately not provide a raintight connection.

An object of applicant's invention is to provide couplings and connectors (fittings) for electrical installations which are raintight.

A further object is to provide such couplings and connectors, which are superior to those currently available in the industry.

Still another object is to provide couplings and connectors which are economical to produce so that installations in wet locations can employ threadless raintight couplings and connectors without a significant increase in cost over similar non-raintight couplings and connectors now sold in the market place.

Another object of this invention is to provide improved raintight couplings and connectors which ensure a continuous and adequate electrical ground through these fittings.

One of the more important objects is the provision of a fitting, whether a coupling or a connector, that has a positive seal which is not subject to UV degradation.

Other objects and advantages will be apparent from the specification which follows and the drawings accompanying this application.

SUMMARY OF THE INVENTION

The above objects and others can be accomplished in a raintight, threadless fitting for joining electrical conduits which includes a hollow cylindrical housing means operable to receive the un-threaded end of at least one electrical conduit therein with the housing means having internal stop means therein operable to limit the progress of said electrical conduit into the housing means when such conduit is inserted into the fitting, a compression ring sized to fit into said housing and over the conduit inserted into the housing with the ring having a plurality of tapered segments one side and a radial face on the other side and a sealing member located on the conduit adjacent to the radial face plus relief in the housing operable to radially drive the sealing member against the conduit to create a seal between the housing and the conduit inserted therein and threaded means operable to drive the sealing means into said relief and to compress the segments of the ring against the conduit to lock it in the housing. Due to the tapered segmented projections superior wedging action is achieved to lock the conduit in the housing and also ensure continuity through the fitting.

DESCRIPTION OF THE INVENTION

The Prior Art

Figure 1:
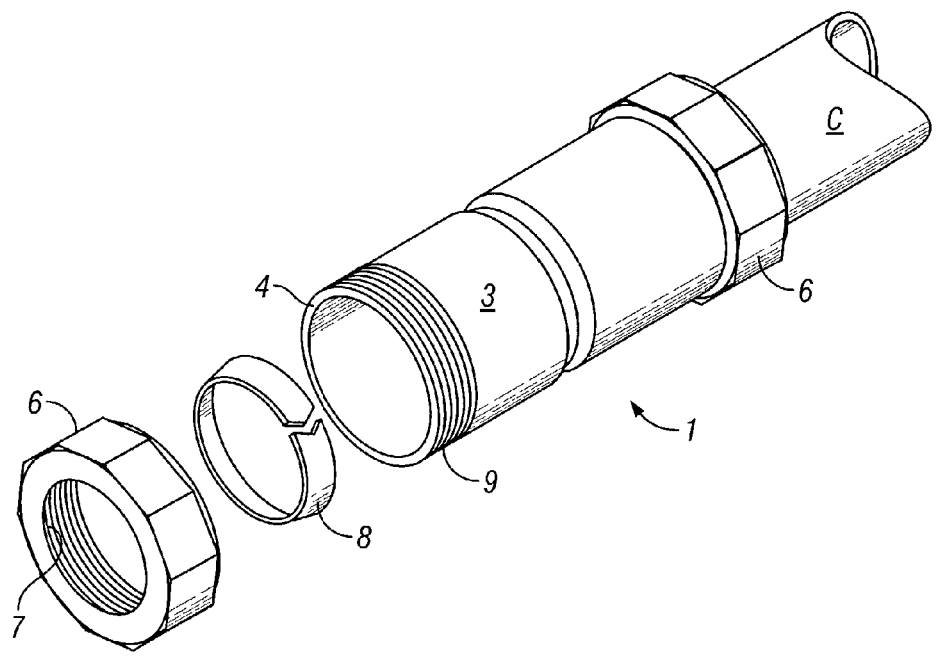
FIG. 1 is an exploded perspective, in part, of a prior art coupling illustrating the mechanical lock formed by a split wedging ring and nuts at each end of the coupling.
Figure 2:
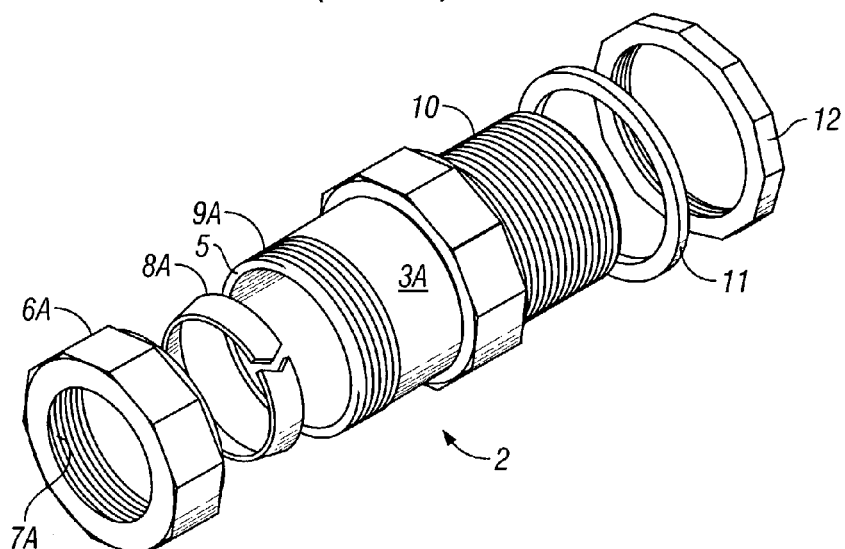
FIG. 2 is an exploded perspective, of a prior art connector which is employed to connect conduits to junction boxes and the like illustrating the mechanical lock formed by a split wedging ring and a nut at the conduit end of the connector.

FIG. 1 illustrates a prior art coupling 1 and FIG. 2. illustrates a prior art connector 2. In the parlance of the trades, threadless couplings 1 are used to join conduits end to end while threadless connectors 2 are used to join conduits to junction boxes or the like.

In these figures it can be seen that in both the coupling 1 and the connector 2, the fittings, have a hollow cylindrical housing 3 and 3A with an internal diameter sized so that it will receive the outer diameter of an electrical conduit C, of the size for which the fitting is made. Thus such a conduit will fit into the ends 4 and 5 respectively of the housings of these fittings. Before a conduit is inserted, a cylindrical nut 6 (coupling) or 6A (connector), having a central aperture 7 or 7A, is slipped onto the conduit and thereafter a split wedging ring 8 or 8A is assembled on the conduit. After such a conduit is inserted into either of the housings, the nut and the split ring are advanced to the housing and the nut engages the external threads 9 or 9A on the ends of the housing. As each nut is tightened onto its housing using the mating threads in the nut, the split ring is radially compressed against the inserted conduit C by a conical relief (not shown) in the nut or in the housing (or in both), which wedges this ring against the conduit, mechanically locking the conduit in the fitting. In larger size conduits, 3 inch diameters and up, considerable effort is required to tighten the nuts sufficiently to obtain a good mechanical lock and ensure adequate electrical continuity through the fitting.

Moreover, when the fitting is a coupling 1, two large wrenches are required to prevent the coupling from turning on the conduits when the nuts are tightened onto their housing 3.

As can be seen in the drawings of FIG. 1 and FIG. 2, the difference in these fittings, is that the coupling 1 has two cylindrical nuts 6 and two split rings 8 (one ring not shown due to partial assembly), i.e., a nut and ring for each end of the coupling. By contrast the connector 2 has only one cylindrical nut 6A and one split ring 8A as it is designed to connect a conduit to a junction box or the like (not shown). This connection to a junction box is accomplished by a hollow threaded boss 10 extending from the end of the connector on which a sealing washer 11 is inserted before the boss is inserted in the hole in a junction box and then the nut 12 is then screwed on to the boss on the inside of the box to join the connector to the box.

As noted above these fitting are not raintight, both from the fact that the outer dimensions of the conduits and the inner dimensions of the fittings vary considerably, plus the fact that the split ring has a gap so that it can be radially compressed onto the conduit to lock the conduit in the fittings leaving an opening for the ingress of water.

The Invention(s)

Figure 3:
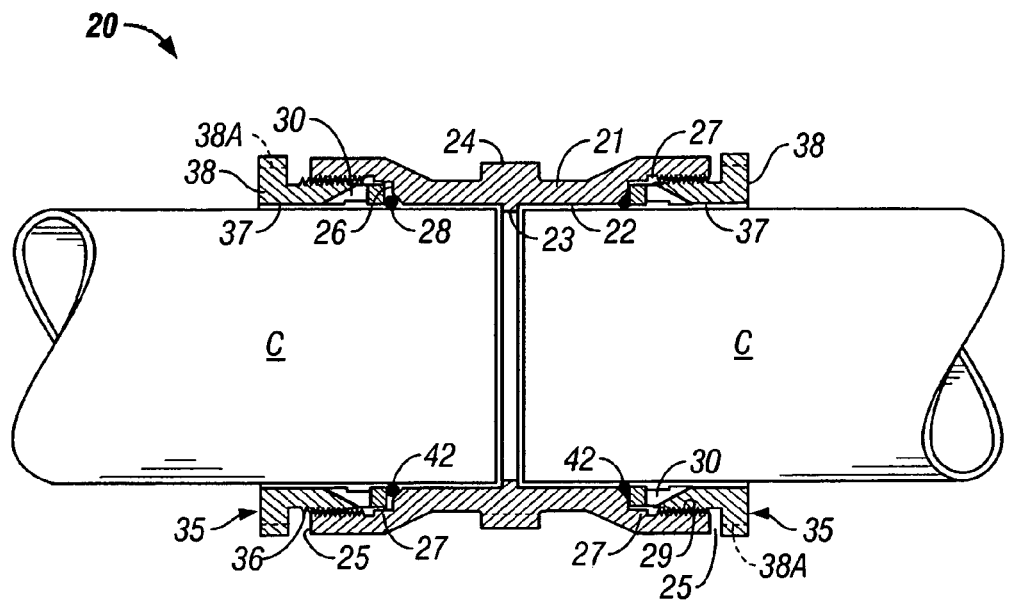
FIG. 3 is a section of the novel coupling according to this invention showing the internal details of its compression ring and O-ring sealing element, with the ends of conduit in the fitting.

In FIG. 3 one embodiment of the novel coupling 20, according to this invention, is illustrated. It includes a hollow housing 21 which has a central bore 22 sized to received the ends of conduits being joined with the coupling. A central stop 23 is formed in the middle of this bore, usually by an integral flange extending into this aperture, against which the ends of the conduits will abut when inserted from opposite ends of the coupling. Other types of stops can be employed. Centrally located on the exterior of the housing are raised wrench flats 24 which enables the coupling to be easily stabilized with a wrench when it is being installed in conduits.

Adjacent to ends 25 of the coupling 20, an internal shoulder 26 is formed by providing a co-axial secondary bore 27 in each end of the housing 21 of a larger diameter than the central bore 22 at each end of the coupling, as can be seen in FIG. 3. Typically the face 26A of each shoulder is normal to the axis of these bores. A 45 degree relief 28 is provided at the conjunctions of the central bore and the two secondary bores where the shoulder is formed. In place of providing the relief contiguous to the shoulder it can be provide in the compression ring described later.

Also in the embodiment illustrated in FIG. 3, the two secondary bores 27 are provided with internal threads 29 at each end 25 of the coupling 20.

Figure 7:
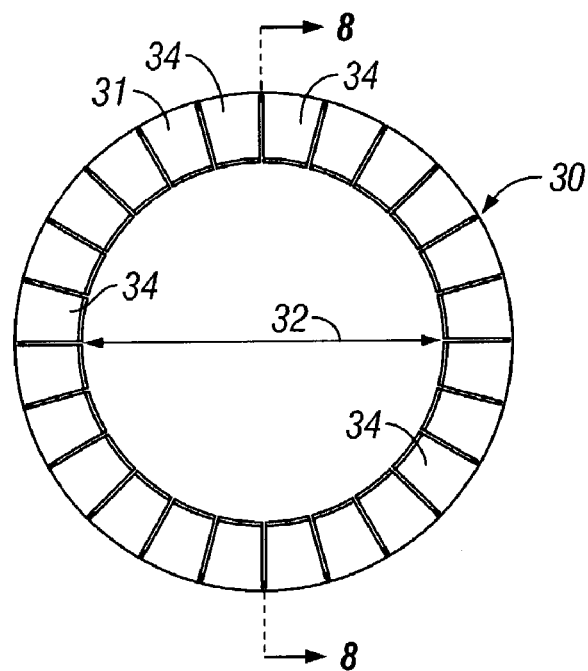
FIG. 7 is a plan of the compression ring employed with both the couplings and the connectors of this invention shown in FIG. 3 and FIG. 6.
Figure 8:
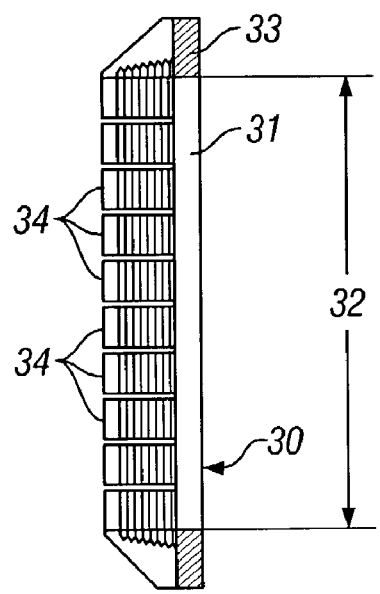
FIG. 8 is a section of the compression ring illustrated in FIG. 6.

As the secondary bores 27 in this housing 20 are larger than the outside diameter [OD] of the conduits being joined, there is space in these bores for a compression ring means 30 to be slipped over the OD of the conduits and then received in these bores. Instead of the split ring illustrated in the prior art couplings and connectors, shown in FIGS. 1 and 2, this invention employs a specially designed compression ring means which is best shown in FIGS. 7 and 8. While the compression ring is shown as a single element, in the referenced drawings, it can be constructed of several parts which in conjunction with each other can function in the same manner as the specially designed compression ring means illustrated.

The compression rings 30 used in this invention are composed of a solid ring 31 which has an inner diameter [ID] 32 large enough to slip over the OD of the conduit being joined with the coupling 20 and a radial face 33 adapted to abut against one of the afore described shoulders 26 formed in the housing 21 of the coupling. On the ring opposite the face 33 are a series of segmented projections 34 which taper from the OD of the ring to its ID as can be seen in FIG. 7 and FIG. 8. These projections are formed by radially notching this tapered part of the compression ring and as a result these individual projections can be radially compressed against the outer surface of a conduit by an appropriate wedging member to provide this necessary clamping action to fix the conduit in the fitting and to maintain electrical continuity through the coupling.

As can be seen in FIG. 3 a bushing nut 35 is used at each end 25 of the coupling 20 as a wedging member to radially force the projections 34 of the compression ring 30 against a conduit C inserted into the ends of the coupling. Each bushing nut has external threads 36 and a bushing bore 37 which is large enough to slip over the OD of a conduit for which the coupling is designed. Wrench flats 38A are located on the flange 38 on the exterior end 39 of each bushing nut and their inner ends 40 are counter bored to form a conical surface 41 which tapers from their inner ends of the bushing bore to its OD. This taper on the bushing nuts closely matches the taper of the projections 34 of the compression rings 30 and as these nuts are advanced by the engagement of their exterior threads with internal threads 29 of the cylindrical housing 21 the projections or segments are forced radially inward and will lock a conduit in the coupling in the housing as the nuts are tightened.

An O-ring 42 is located between each solid ring 310f each compression ring 30 and the reliefs 28 at the conjunction of the central bore 22 and the secondary bores 27 in the housing 21. As the compression ring is forced against the shoulders 26 the O-ring is driven into the relief 28 which forces it radially against the OD of a conduit in the fitting to effect a seal between the housing and the conduit. Of course other sealing devices can be used in place of the more conventional O-rings Once the compression ring abuts against the shoulder the axial advance of this ring into the fitting stops, preventing damage to the O-ring after compression occurs.

Figure 4:
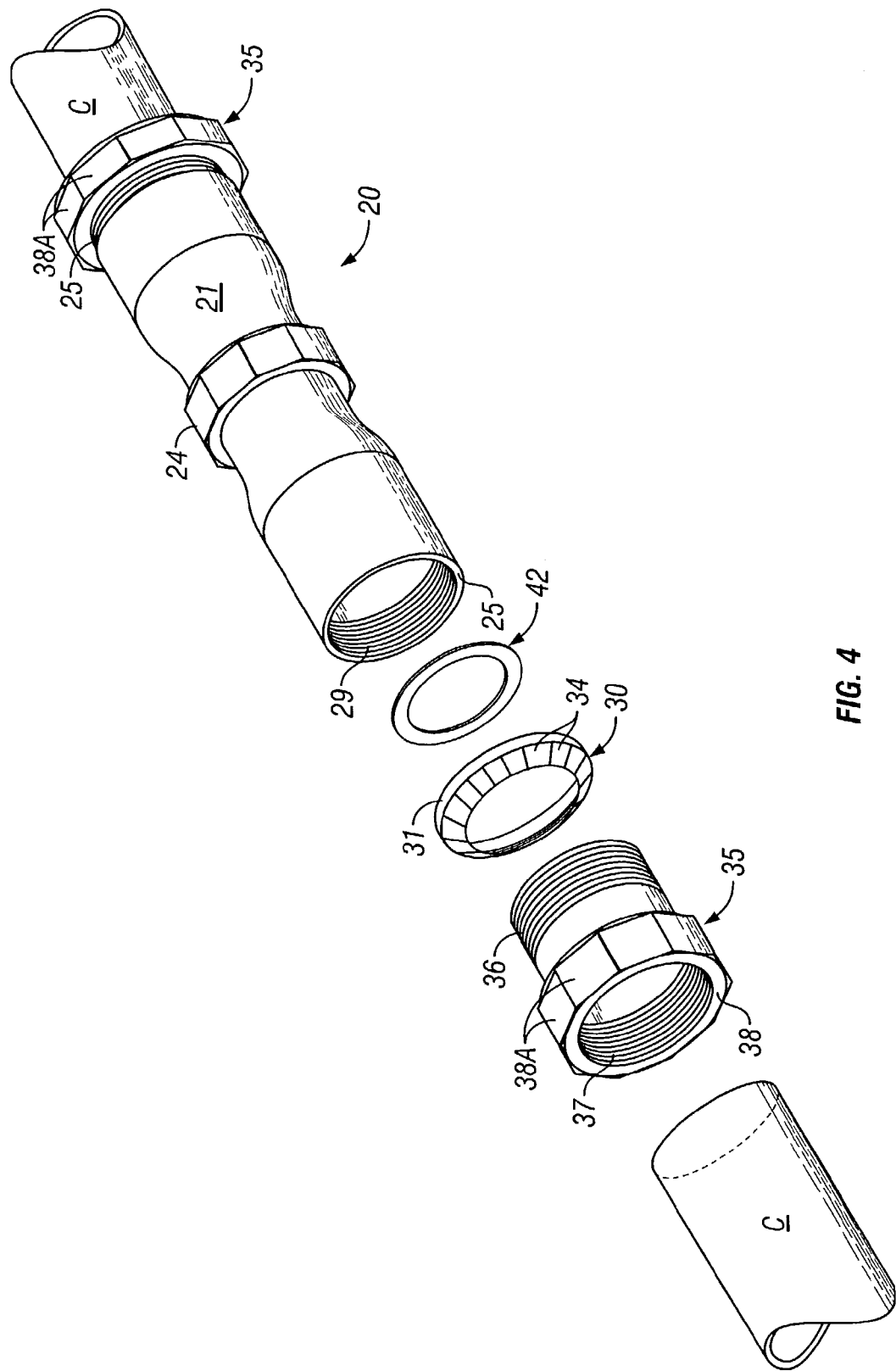
FIG. 4 is an exploded perspective of the novel coupling according this invention illustrating how it is assembled with electrical conduits.

In FIG. 4, the exploded perspective, illustrates assembly of conduits with the novel coupling 20. As can be seen the bushing nut 35 is slipped onto the conduit C, followed by the compression ring 30 with the segmented projections 34 facing the nut and then the O-ring 42 is stretched over the conduit C. Once this assembly has been accomplished the end of conduit C is inserted into the coupling and advanced until its end hits the central stop 23. Thereafter the bushing nut is moved to the housing advancing the compression ring and O-ring along the conduit and into the housing engaging and the exterior threads 36 on the nut mate with the internal threads 29 of the housing. Tightening the bushing nuts on the mating threads will drive the O-ring 42 into the relief 28 as the solid ring 31 of the compression ring is abuts against the shoulder 26 producing a water tight seal between the conduit C and the housing. As the bushing nuts are further tightened, the projections 34 of the compression ring will be radially forced into the OD of the conduit C locking the conduit in the housing and providing good electrical continuity between the coupling and the conduit C. In FIG. 3 the bushing nut at one end of the coupling is shown in its advanced position distorting the O-ring sufficiently to effect a positive seal between the housing and the conduit and locking the conduit C in the coupling. Using the compression ring having the solid ring portion 31 abutting against the shoulder 26 also avoids damage to the O-ring or other sealing member when the bushing nuts are tightened to lock the conduit in the housing.

Figure 5:
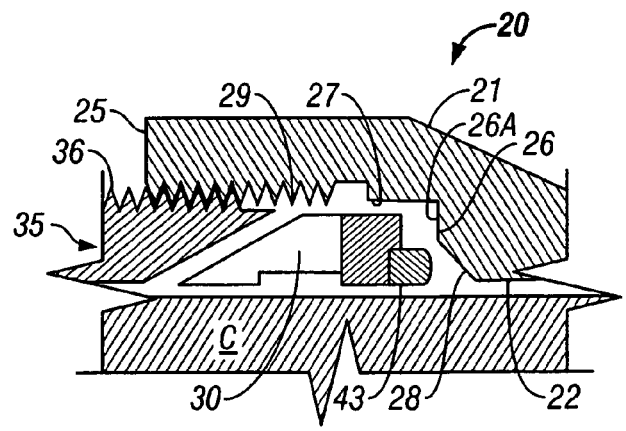
FIG. 5 is a broken away section illustrating the substitution of a elastomer seal fused to the compression ring in place of a conventional O-ring.

In place of O-ring 42, it is possible to bond an elastomer ring-like sealing element 43 to the solid ring 31 of the compression rings 30 as shown in FIG. 5. This ring-like sealing element will be received in the relief 28 and effect a water tight seal in the same manner as described for the O-ring. Its advantage is that one less element must be handled by an electrician using the coupling. Moreover it should be understood that the relief 28 shown at the ID of the shoulder 26 could alternatively be formed on the ID of the sold ring 32 of the compression ring 30 [not shown] without departing from the spirit of the invention.

Figure 6:
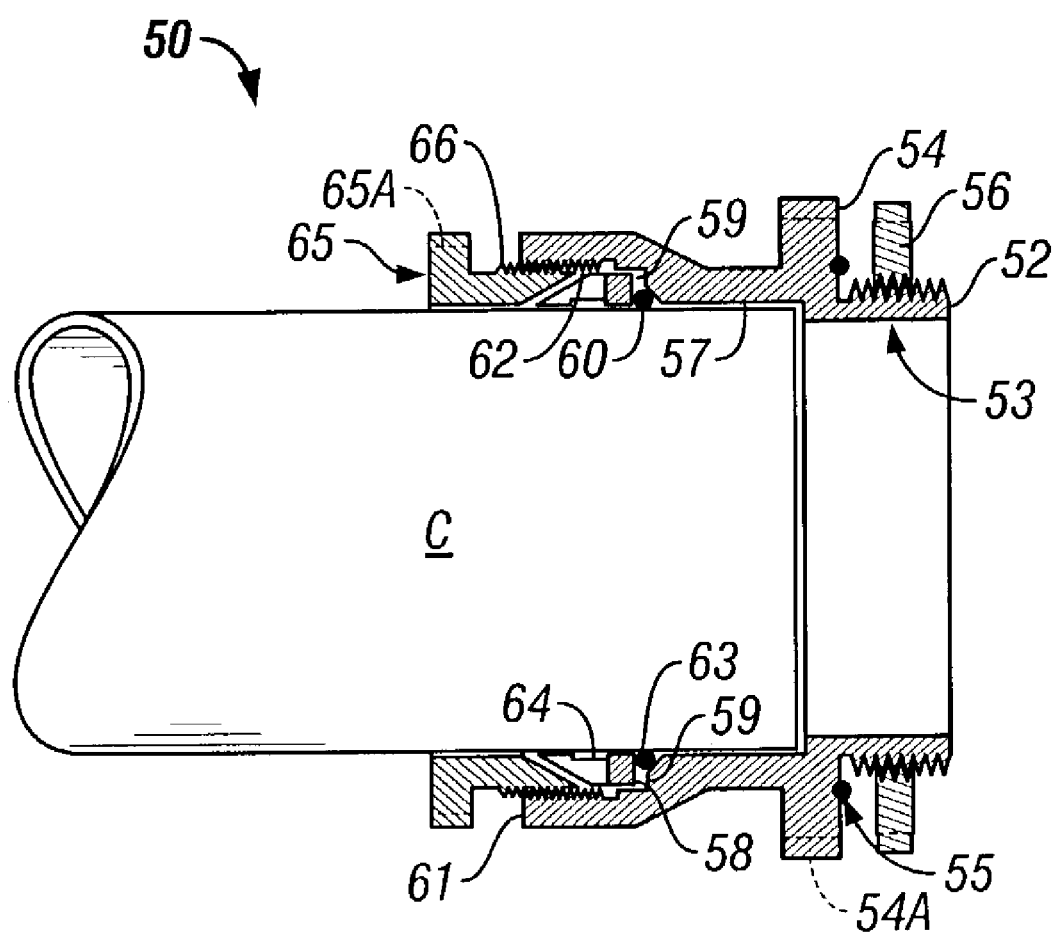
FIG. 6 is a section of a connector employing the principles used in the coupling in FIG. 3.

In FIG. 6 a connector 50 is illustrated employing the features described for the coupling 20 above, which includes a housing 51 which has a hollow threaded boss 52 extending from one end 53 of the housing for joining this connector to a junction box or the like. Like a conventional connector, there is a radial flange 54 with wrench flats 54A between the boss and the housing which flange abuts against a junction box [not shown] when the boss passes through an aperture therein. This flange can include an O-ring 55 or an elastomer washer (not shown) on the boss which will abut against the surface of the box when the connector is attached. The connector is secured in the box with a nut 56 which is applied to the boss from inside the box and then tightened to secure the connector to the box and effect a seal between the box and the connector utilizing the O-ring shown in FIG. 6.

Like the coupling 20 the connector 50 has a central bore 57 adapted to receive the OD of a conduit and a larger secondary bore 58 co-axially aligned with the central bore, creating a shoulder 59 at their conjunction. A relief 60 is formed at the ID of the shoulder. In the end 61 of the connector internal threads 62 are formed like threads in ends of the coupling. The other parts to this connector are the same as the coupling, including an O-ring 63, a compression ring 64 and a bushing nut 65 with wrench flats 65A which function in the same manner as previously described, when the external threads 66 on the bushing nuts are screwed into internal threads 62 of the housing. The compression ring and O-ring are located and positioned as shown in FIG. 6 having been previously assembled on the conduit C after the bushing nut is placed thereon. As a bushing nut is advanced it drives the O-ring into the relief and when the radial face of the compression ring abuts on the shoulder 59, further advance of the bushing nut will drive the projections on this ring into the OD of the conduit in the connector locking it in place.

Figure 9:
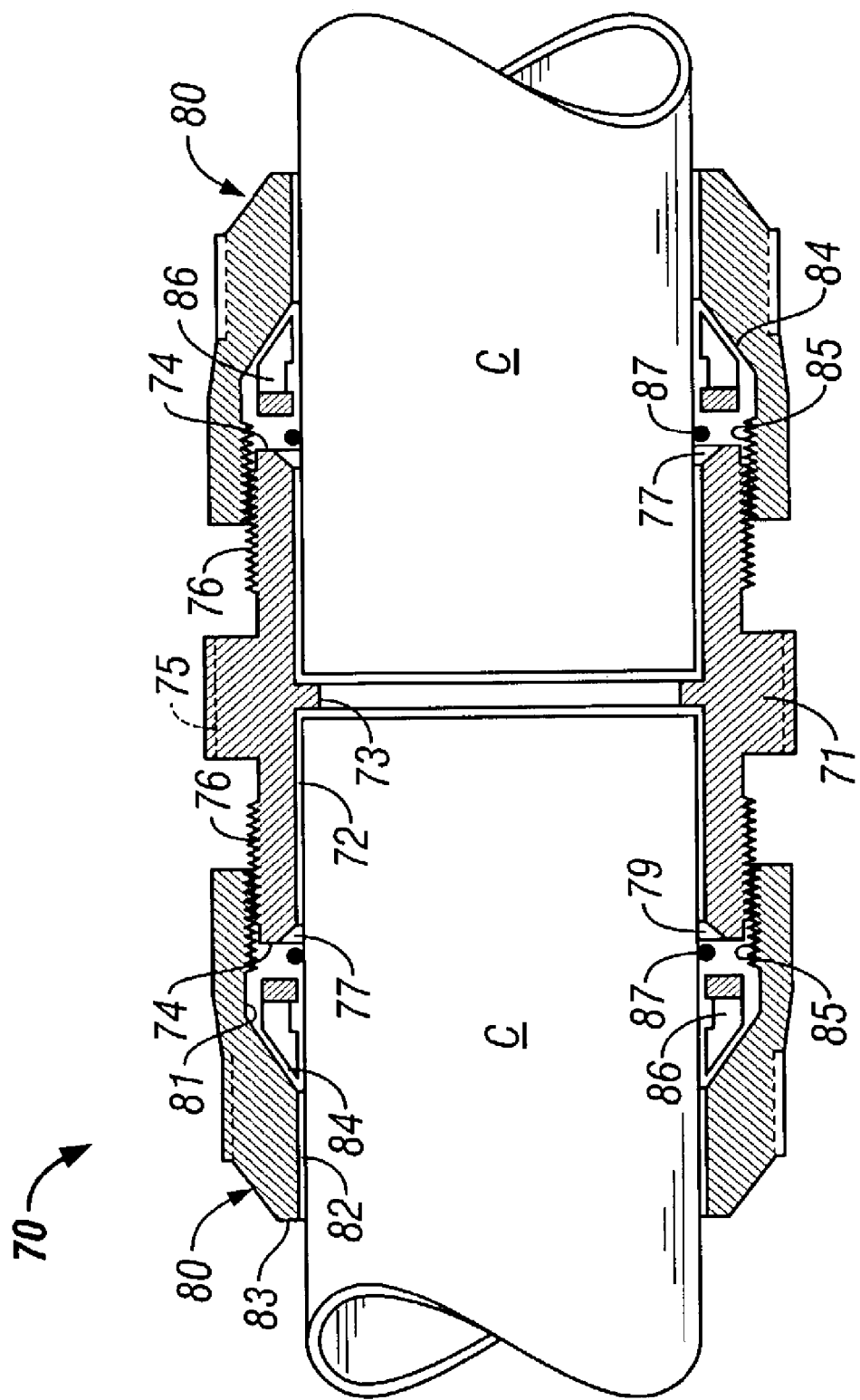
FIG. 9 is a modification of the coupling illustrated in FIG. 3 employing exterior threading on the coupling and nuts employed to compress the compression ring against the conduit in place of the internal nuts illustrated in FIG. 3.

A smaller more compact versions of a coupling 70 according to this invention is illustrated in FIG. 9, which reverses parts of the embodiment shown in FIG. 3 by employing external threads on the housing and internal threads on the collar nuts but using the same sealing and locking principles described above with respect to coupling 20 and connector 50.

More specifically, the coupling 70 employs a housing 71 which has a single bore 72 which sized to receive the OD of a conduit C at each end. This bore has a central stop 73 against which the end of the conduits inserted into the opposite ends 74 of the coupling abut so that the conduits are properly positioned. Centrally located on the exterior of the housing is a series of wrench flats 75 which enable the housing to be stabilized when its is assembled with its other components. The opposite ends of the housing are provided with external threads 76 and a 45 degree relief 77 is provided about the ends of the bore as can be seen in FIG. 9. As can be appreciated this embodiment is easier to construct that those previously discussed.

Again referring to FIG. 9 it can be seen that special nuts 80 are employed with the housing 71 of the coupling 70. As can be seen the nuts have two bores, a larger bore 81 which is co-axially aligned with a smaller bore 82, the latter bore opening at the end 83 of the nut being only slightly larger in diameter than the OD of the conduit being joined with the coupling. At the conjunction of these two bores in the central part of each nut a taper or conical ramp 84 is formed which, as illustrated, is approximately 45 degrees and the opening in the larger bore each nut is provided with internal threads 85 which mate with the threads 76 at the opposite ends 74 of the housing.

As can be seen in FIG. 9 the large bore provides space for receiving a compression ring 86, which is identical to compression ring 30 previously described. To use the coupling, nut 80 is slid onto a piece of conduit followed by the compression ring and then the O-ring 87. Once this has been accomplished the end of the conduit having these parts assembled thereon is inserted into the housing 71 and advanced until its end hits the central stop 73. Thereafter the nut assembled on each conduit can be advanced until its internal threads engaged the external threads 76 on the housing. Holding the housing with the wrench flats 75 on the housing thereon the nut can be tightened with a second wrench, driving the radial face of the compression ring into the end 74 of the housing limiting its axial advance while simultaneously compressing the O-ring in the recess 77 effecting a raintight seal between the housing and a conduit in that end of the in the coupling. As nuts are screwed further onto the housing the segments on the compression ring are driven radially inward to grip the conduits in the housing and ensure continuity between the coupling and the conduits. The same assembly is followed at both ends of the coupling for joining conduits end-to-end.

Figure 10:
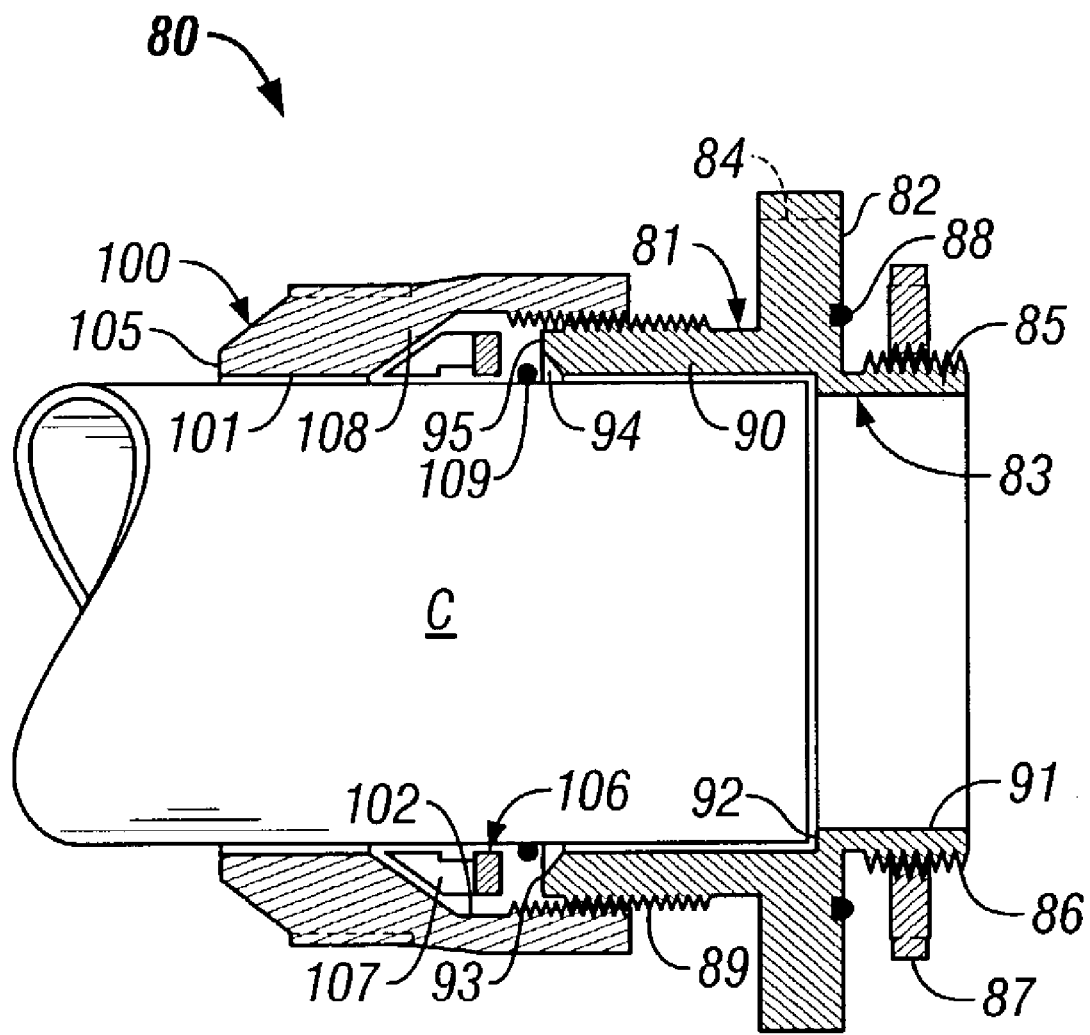
FIG. 10 is a modification on the coupling illustrated in FIG. 3 using the design illustrated in FIG. 9 for the coupling in the connector shown in this figure.

In FIG. 10 a connector 80 is shown which employs the design in the embodiment of the invention shown in FIG. 9 for a coupling. In this connector the housing 81 has a radial flange 82 at one end 83 which includes wrench flats 84. Projecting from the flange is a hollow boss 85 which includes exterior threads 86. This boss is used to connect the connector to a junction box or the like (not shown) by inserting the boss into an aperture in the box and then screwing the nut 87 onto the boss from inside the box. When the nut is tightened on the boss the preformed seal member 88 in the radial face of the flange engages the box in a sealing relationship.

On the end opposite the boss, the housing 81 is supplied with exterior threads 89 and its central bore 90 is sized so that it will receive the OD of a conduit which is being connected to a junction box or the like. As the bore 91 in the boss is slightly smaller than the co-axial central bore there is a step 92 at their conjunction which forms a stop for the end of a conduit inserted into connector 80. At the mouth 93 of the housing the central bore has a relief 94 which is typically at a 45 degree angle to the axis of the central bore as can be seen in FIG. 10 and the end 95 of the housing forming a shoulder against which the compression ring abuts.

For this connector 80 a sleeve nut 100 is employed which has two co-axial bores 101 and 102, the latter being of a larger diameter and including in its mouth 103 internal threads 104 which mate with the threads 89 on the housing 81. The smaller bore at the distal end 105 of the nut is sized so the nut will slide over the OD a piece of conduit being connected to a junction box or the like.

In the larger bore a compression ring 106 is inserted with it tapered projections 107 facing a conical bevel 108 between the conjunction of the two bores in the nut. The angle of the bevel is matched to that of the tapered projections on the compression ring, as can be seen in FIG. 10. This compression ring is the same construction as compression ring 30 previously described.

As previously noted, when a connector of this type is used the sleeve nut 100 followed by the compression ring 106 are slipped on the conduit C and then the an O-ring 109 is slipped onto the conduit so it is positioned as shown in FIG. 10 when the nut is screwed onto the housing. As can be appreciated from this illustration, and the prior descriptions, the nut will drive the compression ring against the end 95 of the housing 81 and simultaneously force the O-ring into relief 94, compressing it sufficiently so it expands radially against the OD of the conduit to effect a seal between the conduit and the housing. Again as the nut is further advanced, the projections 107 will be driven radially inwardly into the OD of the conduit to lock it in the connector 80 also providing the required electrical continuity between the fitting and the conduit.

As can be appreciated there are variations in the design of the components, all of which accomplish forming a seal between a housing and a conduit in the fittings plus a secure retention of the conduit or conduits therein along with providing continuity through these fittings.

I claim:

1. A raintight, threadless fitting for connecting metal non-threaded electrical conduits comprising:

a hollow cylindrical housing means having a bore operable to receive an un-threaded end of at least one electrical conduit therein, such bore having a stop means therein operable to limit the ingress of such electrical conduit into said housing means when such conduit is inserted such bore;

thread means disposed at an end of said cylindrical housing means;

shoulder means formed at said end of said cylindrical housing means;

compression ring means at said end of said fitting operable to slip over end of such conduit being joined with said fitting, said compression ring having a solid ring portion and a series of segmented projections extending axially from said solid ring portion tapering from the inner diameter of said compression ring means to the outside diameter of said solid ring portion thereof;

elastomer sealing means between said solid ring portion and said shoulder means operable to compress said sealing means between the fitting and a piece of such conduit inserted into said fitting as said compression ring means abuts against said shoulder means to form a raintight seal there between; and nut means having threads operable to engage said thread means at said end of said housing means, said nut means having an aperture operable to slip over such conduit being joined to said fitting, said mating threads operable to advance said nut means against said series of said segmented projections of said compressing ring means to axially drive said solid ring of said compression means against said shoulder means, compressing said sealing means between said fitting and such conduit inserted in said fitting and to wedge said projections against such conduit to mechanically fix such conduit in said fitting.

2. The fitting defined in claim 1 wherein the shoulder means has a relief means about its inner periphery and the compression ring means is operable to drive the sealing means into said relief means forcing it against such conduit to effect a raintight seal between said fitting and such conduit.

3. The fitting defined in claim 1 wherein the solid ring portion of the compression ring means has a relief means about its inner periphery which is operable to drive the sealing means against such conduit to effect a raintight seal between said fitting and such conduit when said solid ring portion abuts against the shoulder means.

4. The fitting defined in claim 1 wherein the solid ring portion of the compression ring means is integral with the series of segmented projections.

5. The fitting defined in claim 1 wherein the solid ring portion of the compression ring means is a separate element and the series of segmented projections consists of a separate element.

6. A raintight, threadless coupling for joining electrical conduits end-to-end comprising:
   a cylindrical housing means with a bore operable to receive the un-threaded ends of electrical conduits in its opposite ends, such bore having a central stop means therein operable to limit the ingress of said ends of said electrical conduits into said housing means when such conduits are inserted into said coupling;
   threaded means disposed at each end of said cylindrical housing means;
   shoulder means formed at each end of said cylindrical housing means;
   a compression ring means at each end of said coupling operable to slip over ends of said conduits being joined by said coupling, each said compression ring having a solid ring portion and a series of segmented projections projecting axially from said solid ring portion, said projections tapering from the inner diameter of said compression ring means to the outside diameter of said solid ring;
   elastomer sealing means located between each said solid ring portion of said compression ring means and said shoulder means operable to seal such conduit in said housing means when compressed; and
   nut means with apertures to slip over such conduits being joined at each end of said coupling, said nut means operable to screw onto said threads at said ends of said housing means to drive the associated solid ring of each compression means against said associated shoulder means and compress said associated sealing means between the associated conduit in said coupling to effect a seal there between and to drive said series of segmented projections of each of said compressing ring means radially against its associated conduit to fix such associated conduit in said coupling.

7. The coupling defined in claim 6 wherein the housing means has internal threads at each end and the nuts means have external threads thereon to engage said internal threads of said housing means.

8. The coupling defined in claim 6 wherein the housing means has external threads at each end and the nuts means have internal threads therein to engage said external threads of said housing means.

9. The coupling defined in claim 6 wherein each sealing means is an o-ring.

10. The coupling defined in claim 6 wherein each sealing means is an elastomer ring bonded to the solid ring of each of the compression ring means.

11. The coupling defined in claim 6 wherein each of the shoulder means has a relief means about its inner periphery and the compression ring means is operable to drive the sealing means into such relief and against an associated conduit in the coupling to effect a raintight seal between the coupling and each conduit.

12. A raintight, threadless connector for joining electrical conduits to junction boxes comprising
   a cylindrical housing means having a bore operable to receive the un-threaded end of a electrical conduit, said housing means having central stop means in such bore operable to limit the progress of said electrical conduit into said housing means when such a conduit is inserted into said connector;
   threaded means disposed at the end of said cylindrical housing means adapted to receive such conduit and a hollow threaded boss extending from the opposite end of said housing adapted to be received in a junction box;
   shoulder means formed at such bore in said cylindrical housing means;
   a compression ring means operable to slip over the end of such conduit being joined with said connector, said compression ring having a solid ring on one side operable to engage said shoulder means and on the other side a series of segmented projections tapering from its inner diameter of said compression ring means to the outside diameter said solid ring thereof;
   elastomer sealing means between said solid ring of said compression ring means and said shoulder in said connector operable to seal a conduit in said housing in a raintight joint;
   nut means with an aperture to slip over said conduit being joined to said connector, said nut means operable to screw onto said threads at said end of said housing means to advance said nut means against said series of said segmented projections of said compressing ring means to drive said solid ring of said compression ring means against said shoulder means and compress said sealing means and wedge said projections against such conduit in said housing means to fix such conduit in said connector.

13. The connector defined in claim 12 wherein the housing means has internal threads at said end and the nut means has external threads thereon to engage said internal threads of said housing means.

14. The connector defined in claim 12 wherein the housing means has external threads at said end and the nut means has internal threads therein to engage said external threads of said housing means.

15. The connector defined in claim 12 wherein each sealing means is an o-ring.

16. The connector defined in claim 12 wherein the sealing means is an elastomer ring bonded to the compression ring means.

17. The connector defined in claim 12 wherein the shoulder means has a relief means about its inner periphery and the compression ring means is operable to drive the sealing means into said relief means forcing it against such conduit to effect a raintight seal between said connector and such conduit.

18. A raintight, threadless fitting for connecting metal non-threaded electrical conduits comprising:
- a hollow cylindrical housing means having a bore operable to receive an un-threaded end of at least one electrical conduit therein, such bore having a stop means therein operable to limit the ingress of such electrical conduit into said housing means when such conduit is inserted in such bore;
- thread means disposed at an end of said cylindrical housing means;
- shoulder means formed at said end of said cylindrical housing means;
- ring means at said end of said fitting operable to slip over an end of such conduit being joined with said fitting, said ring means having a solid ring portion operable to abut said shoulder means;
- sealing means between said ring means and said shoulder means operable to be compressed between the fitting and a portion of such conduit inserted into said fitting when said ring means abuts against said shoulder means to form a raintight seal therebetween;
- cylindrical compression means next to said ring means on the opposite side thereof from said sealing means; and
- nut means having threads operable to engage said thread means at said end of said housing means, said nut means having an aperture operable to slip over such conduit being joined to said fitting, said mating threads operable to advance said nut means against said cylindrical compression means and to axially drive said ring means against said shoulder means, compressing said sealing means between said fitting and such conduit inserted in said fitting and to wedge said compression means between said ring means and said nut means compressing said compression means against such conduit to mechanically fix such conduit in said fitting.

* * * * *